(12) United States Patent
Peters, III et al.

(10) Patent No.: US 7,893,957 B2
(45) Date of Patent: Feb. 22, 2011

(54) RETINAL ARRAY COMPOUND CAMERA SYSTEM

(75) Inventors: Leo J. Peters, III, Houston, TX (US); Chester L. Smitherman, Houston, TX (US)

(73) Assignee: Visual Intelligence, LP, Houston, TX (US)

( * ) Notice: Subject to any disclaimer, the term of this patent is extended or adjusted under 35 U.S.C. 154(b) by 807 days.

(21) Appl. No.: 10/229,626

(22) Filed: Aug. 28, 2002

(65) Prior Publication Data

US 2004/0041914 A1 Mar. 4, 2004

(51) Int. Cl.
*H04N 7/18* (2006.01)

(52) U.S. Cl. ..................... 348/144; 348/143

(58) Field of Classification Search .............. 348/143, 348/42, 47, 48, 51, 57, 50, 144; 359/472; 356/606; 396/12, 427; 382/312; 244/1 R
See application file for complete search history.

(56) References Cited

U.S. PATENT DOCUMENTS

| | | | |
|---|---|---|---|
| 1,699,136 A | 1/1929 | Eliel | |
| 2,104,976 A | 1/1938 | Eliel | |
| 2,433,534 A | 12/1947 | Sonne | |
| 2,747,012 A | 5/1956 | Dresser | |
| 2,955,518 A | 10/1960 | Perry | |
| 3,518,929 A | 7/1970 | Glenn | |
| 4,322,741 A | 3/1982 | Kawabayashi | |
| 4,504,914 A | 3/1985 | Hofmann | |
| 4,650,305 A | 3/1987 | Hines | |
| 4,689,748 A | 8/1987 | Hofmann | |
| 4,708,472 A | 11/1987 | Hofmann | |
| 4,724,449 A | 2/1988 | Wright | |
| 4,750,810 A | 6/1988 | Tomlin et al. | |
| 4,757,378 A | 7/1988 | Hackett, Jr. et al. | |
| 4,764,008 A * | 8/1988 | Wren | 396/427 |
| 4,887,779 A * | 12/1989 | Large | 244/1 R |
| 4,956,705 A | 9/1990 | Wright | |
| 5,027,199 A * | 6/1991 | Suzuki | 348/50 |
| 5,029,009 A | 7/1991 | Ulich | |
| 5,104,217 A | 4/1992 | Pleitner | |
| 5,138,444 A | 8/1992 | Hiramatsu | |
| 5,193,124 A | 3/1993 | Subbarao | |
| 5,249,034 A * | 9/1993 | Minato | 356/606 |
| 5,276,321 A | 1/1994 | Chang | |

(Continued)

OTHER PUBLICATIONS

Mohamed M.R. Mostafa, Joe Hutton; Emerge DSS: A Fully Integrated Digital System for Airborne Mapping; Sep. 22-23, 2003; http://www.isprs.org/commission1/theory_tech_realities/.

(Continued)

*Primary Examiner*—Allen Wong
(74) *Attorney, Agent, or Firm*—Jennifer S. Sickler; Teresa Lechner-Fish; Gardere Wynne Sewell LLP (57) ABSTRACT

The present invention provides a camera system having a compound array of imaging sensors disposed in a retinal configuration. The system preferably comprises a concave housing. A first imaging sensor is centrally disposed along the housing. At least one secondary imaging sensor is disposed along the housing, adjacent to the first imaging sensor. The focal axis of the second imaging sensor, in the preferred embodiment, intersects with the focal axis of the first imaging sensor within an intersection area.

14 Claims, 5 Drawing Sheets

U.S. PATENT DOCUMENTS

| | | | |
|---|---|---|---|
| 5,426,476 A * | 6/1995 | Fussell et al. | 396/12 |
| 5,471,056 A | 11/1995 | Prelat | |
| 5,721,611 A | 2/1998 | Kellner | |
| 5,734,507 A | 3/1998 | Harvey | |
| 5,815,314 A * | 9/1998 | Sudo | 359/472 |
| 5,872,590 A * | 2/1999 | Aritake et al. | 348/57 |
| 5,894,323 A | 4/1999 | Kain et al. | |
| 6,002,815 A * | 12/1999 | Immega et al. | 382/312 |
| 6,055,012 A * | 4/2000 | Haskell et al. | 348/48 |
| 6,422,508 B1 | 7/2002 | Barnes | |
| 6,473,119 B1 * | 10/2002 | Teuchert | 348/144 |
| 6,747,686 B1 | 6/2004 | Bennett | |
| 6,834,163 B2 | 12/2004 | Trunz | |
| 6,954,310 B2 | 10/2005 | Holloway et al. | |
| 7,006,709 B2 | 2/2006 | Kang et al. | |

OTHER PUBLICATIONS

Richard D. Sanchez; Airborne Digital Sensor System and GPS-aided Inertial Technology for Direct Geopositioning in Rough Terrain; Open-File Report 2004-1391; USGS; Reston, VA.

* cited by examiner

RETINAL ARRAY COMPOUND CAMERA SYSTEM

TECHNICAL FIELD OF THE INVENTION

The present invention relates, generally, to the field of remote imaging techniques and, more particularly, to an imaging system providing high-resolution digital imaging over very large fields of view.

BACKGROUND OF THE INVENTION

Remote imaging is a broad-based technology having a number of diverse and extremely important practical applications—such as geological mapping and analysis, military surveillance and planning, and meteorological forecasting. Aerial and satellite-based photography and imaging are especially useful remote imaging techniques that have, over recent years, become heavily reliant on the collection and processing of digital image data. Spatial data—characterizing real estate improvements and locations, roads and highways, environmental hazards and conditions, utilities infrastructures (e.g., phone lines, pipelines), and geophysical features—can now be collected, processed, and communicated in a digital format to conveniently provide highly accurate mapping and surveillance data for various civilian and military applications (e.g., dynamic GPS mapping).

A major challenge facing some such remote imaging applications is one of image resolution. Certain applications require very high image resolution—often with tolerances of inches. Depending upon the particular system used (e.g., aircraft, satellite, or space vehicle), an actual digital imaging device may be located anywhere from several hundred feet to several miles above its target, resulting in a very large scale factor. Providing images with very large scale factors, that also have resolution tolerances of inches, poses a challenge to even the most robust imaging system.

Orthophotography is one approach that has been used in an attempt to address this problem. In general, orthophotography renders an image of a target by compiling varying images of the target. Typically, in aerial imaging applications, a digital imaging device that has a finite range and resolution records images of fixed subsections of a target area sequentially. Those images are then aligned according to sequence to render a composite of a target area. Usually, conventional systems must make some trade-off between resolution quality and the size of area that can be imaged. If the system is designed to provide high-resolution digital images, then the field of view (FOV) of the imaging device is typically small. Numerous imaging iterations must be performed in order to orthographically render an image of a large area. If the system provides a larger FOV, then usually the resolution of the digital image is decreased and the distortion is increased.

Some conventional digital imaging systems have attempted to address these issues with large-scale single lens cameras. These cameras typically comprise a very large primary optical lens, behind which a number of optical sensors are embedded. The characteristics of these configurations, especially the optical properties of the primary lens, tend to render images of very small cross sectional area. Generally, sensors in these systems have either identical or coinciding lines of sight. Such systems are generally inefficient when images with wide FOV are desired. Furthermore, such systems are usually very costly. Rapid development of new sensor technologies renders these systems obsolete or requires that the systems have cumbersome and costly upgrades or modifications.

Other conventional systems have attempted to address the shortcomings of such primary lens configurations through the use of divergent sensor arrays. Usually, optical sensors are outwardly mounted along a convex brace or housing such that their focal axes diverge outwardly from the imaging device. Based on the intended scale factor for the images, the individual sensors in the array can be disposed such that their focal planes adjoin or slightly overlap at a desired distance from the target area. Although such a configuration can provide a wider FOV for imaging, it is still limited in application. The sensor arrays must be mounted within a host aircraft or spacecraft, and thus require a portal in the craft through which to obtain image data. Large sensor arrays require large portals to provide proper optical access for all the diverging sensors in the array. In many cases, however, large portal spaces are impractical, if not impossible, to provide within the small confines of a host craft. Furthermore, larger portals allow a relatively high degree of light backscatter in the array, causing ghost images and degrading the overall quality and reliability of the images obtained.

There is, therefore, a need for an imaging system that provides efficient and versatile imaging for different FOVs, especially very large FOVs, while maintaining image quality and clarity.

SUMMARY OF THE INVENTION

The present invention provides an imaging system having a compound array of imaging sensors disposed such that their focal axes converge, intersect, and thereafter diverge. Individual imaging sensors can be disposed within a housing or a host craft in a concave or retinal configuration, with non-coinciding lines of sight. Depending upon the configuration of the housing or host craft, a small aperture, portal or iris may be formed in the housing, and the array positioned in relation to the aperture, portal or iris, such that the point of intersection of the focal axes coincides with the aperture, portal or iris—the size of which can thus be minimized. Thus, a small aperture in the housing or craft may provide optical access to the target area for a large number of sensors. The individual sensors are disposed, and may be selectively adjusted, to have adjoining or overlapping lines of sight within the target area, resulting in a wide collective FOV of the target area. The imaging array of the present invention thus provides images with very little image distortion. The present invention further eliminates the need for cumbersome, expensive primary lenses.

In one embodiment, the present invention provides a remote imaging system for producing an image of a target that has a housing; a first imaging sensor, coupled to the housing having a first focal axis; and at least one secondary imaging sensor, coupled to the housing and offset from the first imaging sensor, each having a focal axis.

In one embodiment, the present invention provides a system for producing an image of a target viewed through an aperture. The system preferably comprises a housing, having preferably three or more imaging sensors coupled to the housing. Each imaging sensor produces a portion of the image. Each imaging sensor has a focal axis passing through the aperture, such that the focal axes of all imaging sensors intersect within in an intersection area.

The present invention also provides a system for producing an image of a target viewed through an aperture that includes a housing, having a first imaging sensor centrally coupled to the housing. The first imaging sensor has a first focal axis passing through the aperture. A second imaging sensor is coupled to the housing and offset from the first imaging sensor along an axis, and has a second focal axis passing through the aperture and intersecting the first focal axis within an intersection area. A third imaging sensor is coupled to the housing and offset from the first imaging sensor along the axis, opposite the second imaging sensor. The third imaging sensor has a third focal axis passing through the aperture and intersecting the first focal axis within the intersection area.

The present invention also provides a method of producing a remote imaging array. A camera housing having a curvilinear housing axis is provided. A primary imaging sensor is coupled to the housing along the curvilinear housing axis, with the sensor's focal axis projecting outwardly from the housing. Secondary imaging sensors are coupled to the housing along the curvilinear housing axis on alternate sides of the primary imaging sensor, and aligned such that their focal axes intersect the focal axis of the primary sensor at an intersection area and their fields of view align with target areas opposite their respective positions in the housing.

In addition, the present invention provides a compound camera system that comprises a first support member, that is preferably concave, having an apex of curvature at its top. A second support member is angularly displaced with respect to the first support member. The second support member is adapted to intersect the apex of the first support member. A primary imaging sensor is centrally disposed along the concave surface of the first support member, having a primary focal axis projecting orthogonally from the first support member. A plurality of secondary imaging sensors are disposed along the concave surfaces of the first and second supports, at alternating angular intervals from the primary imaging sensor to create two arrays of sensors. The secondary imaging sensors are aligned such that their focal axes intersect with the primary focal axis in a defined intersection area.

In an alternative embodiment of the invention, a remote imaging system for producing an image of a target is provided comprising a housing; an imaging sensor, coupled to the housing by electro-mechanically adjustable attachments; and an actuator that moves the imaging sensor to multiple imaging positions. In yet another alternative, a remote imaging system for producing an image of a target is provided with a housing; an imaging sensor, coupled to the housing; a moveably attached mirror system coordinated with the imaging sensor; and an actuator to move the mirror system to multiple positions to permit imaging of the terrain.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

The preferred embodiment of the present invention provides an imaging system having a compound array of imaging sensors disposed such that their focal axes converge, intersect, and thereafter diverge. Individual imaging sensors can be disposed within a host craft in a concave or retinal configuration, with non-coinciding lines of sight. Depending upon the configuration of the host craft, a small aperture, portal or iris may be formed in the craft, and the array positioned in relation to the aperture, portal or iris, such that the point of intersection of the focal axes coincides with the aperture, portal or iris—the size of which can thus be minimized. Thus, a small aperture in the craft may provide optical access to the target area for a large number of sensors. The individual sensors are disposed, and may be selectively adjusted, to have adjoining or overlapping lines of sight within the target area, resulting in a wide collective FOV of the target area. The imaging array of the present invention thus provides high-resolution images with very little image distortion. The present invention further eliminates the need for cumbersome, expensive primary lenses.

The present invention is applicable for use in a number of photographic and imaging applications, and is particularly applicable to aerial photography and imaging. Therefore, for purposes of explanation and illustration, the present invention is hereafter described within the context of an aerial imaging application. It should be understood, however, that those of skill in the art will, upon reference to this description, be able to apply the principles and teachings of the present invention in a wide variety of imaging systems—from personal digital cameras to manufacturing conveyor inspection systems, satellites and other spacecraft-based surveillance systems.

Figure 1A:
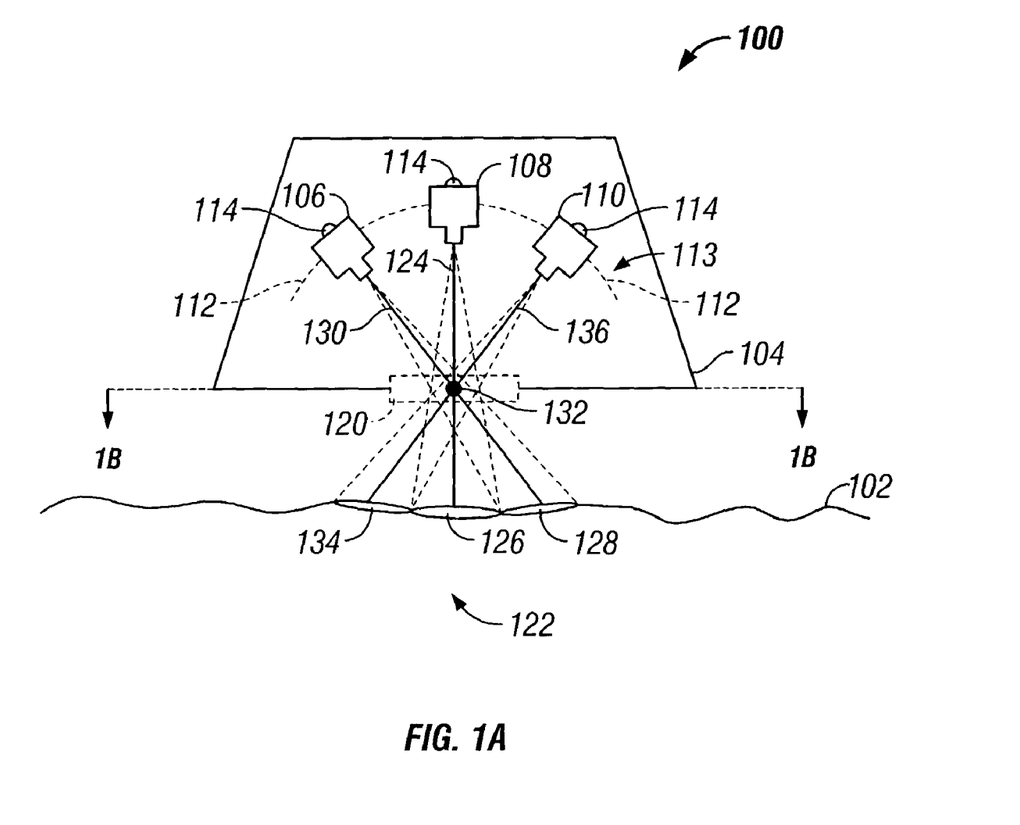
FIG. 1A illustrates a cross-sectional view of one embodiment of an imaging array according to the present invention.
Figure 1B:
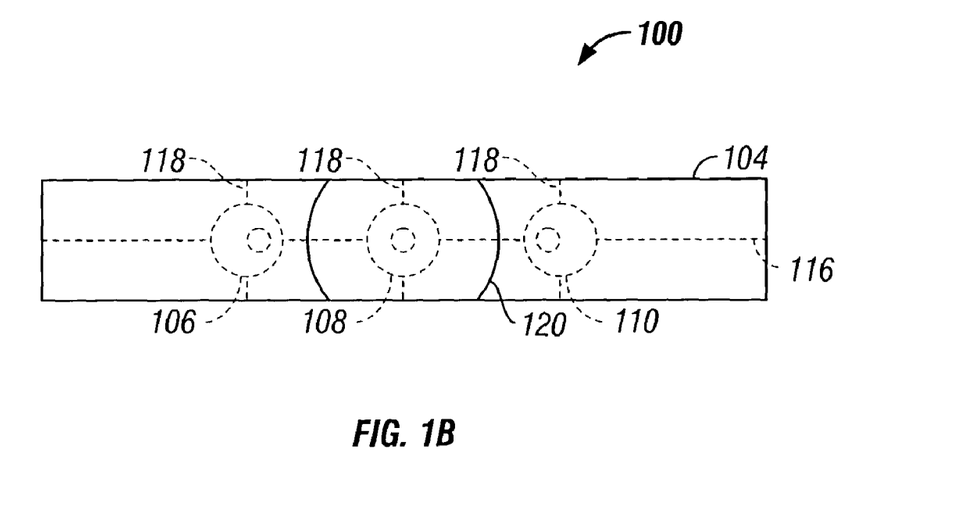
FIG. 1B is an illustration of a bottom view of the array of FIG. 1A, taken along line 1B-1B of FIG. 1A.

Referring now to FIGS. 1A and 1B, one embodiment of the present invention is provided as an illustrative example. FIG. 1A depicts a camera array assembly 100 airborne over target 102 (e.g., terrain). For illustrative purposes, the relative size of assembly 100, and the relative distance between it and terrain 102, are not depicted to scale in FIG. 1A. Assembly 100 comprises a housing 104 within which imaging sensors 106, 108, and 110 are disposed along a concave curvilinear array axis 112, forming an array 113. In all embodiments, the radius of curvature of array axis 112 may be altered dramatically, providing the ability to effect very subtle or very drastic degrees of concavity in axis 112. Alternatively, array axis 112 may be completely linear—having no curvature at all. Imaging sensors 106, 108, and 110 couple to housing 104, either directly or indirectly, by attachment members 114. Attachment members 114 may comprise a number of fixed or dynamic, permanent or temporary, connective apparatus. For example, members 114 may comprise simple welds, removable clamping devices, or electro-mechanically controlled universal joints.

As depicted in FIGS. 1A and 1B, housing 104 comprises a simple enclosure inside of which sensors 106, 108, and 110 are disposed. Sensors 106, 108, and 110 couple, via members 114, either collectively to a single transverse cross member 116, or individually to lateral cross members 118, disposed between opposing walls of housing 104. In alternative embodiments, housing 104 may itself comprise only a supporting cross member of concave curvature to which sensors 106, 108, and 110 couple, via members 114. In other embodiments, housing 104 may comprise a hybrid combination of enclosure and supporting cross member. In the preferred embodiment, housing 104 has an aperture 120 formed in its surface, between the sensors 106, 108, 110 and target 102. However, as mentioned above, the housing 104 structure may be varied significantly, including being a minimal structure that is open on the lower side, such that no aperture 120 is formed.

Depending upon the specific type of host craft, aperture 120 may comprise only a void, or it may comprise a protective screen or window to maintain environmental integrity within housing 104. Optionally, aperture 120 may comprise a lens or other optical device to enhance or alter the nature of the images recorded by the sensors. Aperture 120 is formed with a size and shape sufficient to provide sensors 106, 108, and 110 with proper lines of sight to a target region 122 on terrain 102.

Sensors 106, 108 and 110 are disposed within or along housing 104 such that the focal axes of all sensors converge and intersect each other within an intersection area 132 bounded by aperture 120. Depending upon the type of image data being collected, the specific sensors used, and other optics or equipment employed, it may be necessary or desirable to offset the intersection area 132 or point of convergence above or below aperture 120. Sensors 106, 108 and 110 are separated from each other at angular intervals, which are preferably equal. The exact angle of displacement between the sensors may vary widely depending upon the number of sensors utilized and on the type of imaging data being collected. In alternative embodiments, the angular displacement between sensors may be unequal—so as to provide a desired image offset or alignment. Depending upon the number of sensors utilized, and the particular configuration of the array 113, the focal axes 124, 130, 136 of all sensors may intersect at exactly the same point, or may intersect at a plurality of points, all within close proximity to each other and within the intersection area 132 defined by aperture 120. As the number of sensors and the ruggedness of the environment in which assembly 100 is employed increase, the precise alignment necessary to yield only a single intersection point 132 may be very difficult, if not impossible, to maintain. It is not necessary to maintain a single intersection point 132, as long as all axes converge and intersect in close proximity to one another such that the size and shape of aperture 120 need not be altered to provide a proper line of sight to the sensors 106, 108, 110.

As depicted in FIG. 1A, sensor 108 is centrally disposed within housing 104 along array axis 112. Sensor 108 has a focal axis 124, directed orthogonally from housing 104 to align the sensor's line of sight with image area 126 of region 122. Sensor 106 is disposed within housing 104 along array axis 112, adjacent to sensor 108. Sensor 106 is aligned such that its line of sight coincides with image area 128 of region 122, and such that its focal axis 130 converges with and intersects axis 124 at intersection point 132. Sensor 110 is disposed within housing 104 adjacent to sensor 108, on the opposite side of array axis 112 from sensor 106. Sensor 108 is aligned such that its line of sight coincides with image area 134 of region 122, and such that its focal axis 136 converges with and intersects axes 124 and 130 at intersection point 132. Sensors 106, 108 and 110, as well as subsequently described sensors, may comprise a number of imaging devices including individual cameras, infrared sensors, seismic sensors, photo detectors and photocells. Further, the infrared sensors may be multispectral or hyperspectral. Each sensor may comprise an individual imaging device, a group of sensors. Sensors 106, 108 and 110 are preferably of a homogenous nature, but may comprise a combination of varied imaging devices.

From point 132, axes 124, 130 and 136 diverge. Thus, sensors 106 and 110 are alternately disposed within housing 104 along array axis 112 such that each sensor's focal axis converges upon point 132, crosses focal axis 124, and aligns its field of view with a target area opposite its respective position in the array 113—resulting in a "cross-eyed", retinal relationship between the sensors and the imaging target(s). If members 114 are of a permanent and fixed nature (e.g., welds), then the spatial relationship between aperture 120, the sensors, and their lines of sight remain fixed—as will the spatial relationship between image areas 126, 128 and 134. Such a configuration may be desirable in, for example, a satellite surveillance application where assembly 100 will remain at an essentially fixed distance from region 122. The position and alignment of the sensors is set such that areas 126, 128 and 134 provide full imaging coverage of region 122.

In other applications, however, it may be desirable to selectively adjust, either manually or by remote automation, the position or alignment of the sensors so as to shift, narrow or widen areas 126, 128 and 134, and thereby enhance or alter the images collected by assembly 100. One such embodiment is illustrated now by reference to FIG. 2.

Figure 2:
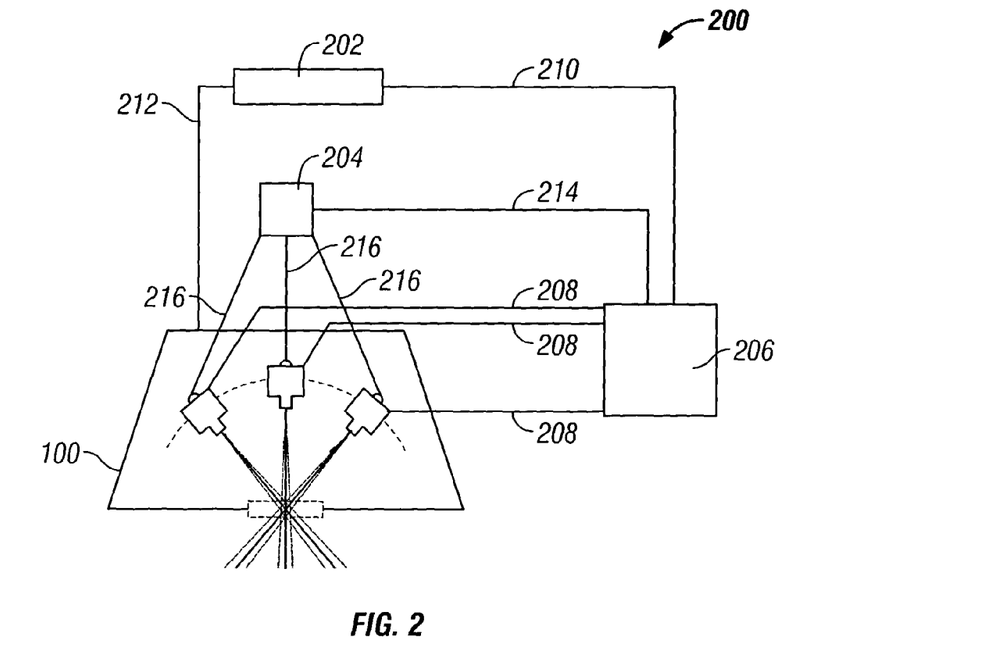
FIG. 2 illustrates one embodiment of a remote imaging system according to the present invention.

An airborne imaging system 200 is depicted, and comprises an array assembly 100 in addition to a flight control system 202, a camera control system 204, and an image processing system 206. System 206 receives imaging data from the imaging sensors within assembly 100 via communicative links 208. Links 208 may comprise direct, physical connectors (e.g., wires, cables) between assembly 100 and system 206, or they may comprise communications connections (e.g., wireless transceivers). System 206 may be located within the same host craft (e.g., airplane) as assembly 100, or may be remotely located apart from the host craft (e.g., satellite monitoring station). Imaging data from assembly 100 is transmitted to system 206, where it may be monitored, analyzed, processed or stored. If a change is desired in the imaging data being collected by assembly 100, system 206 may initiate changes in the position of the host craft, assembly 100, the individual sensors within assembly 100, or any combination thereof.

If a change in the position of the host craft is desired, system 206 provides notification of the desired change to flight control system 202 via communicative link 210 (e.g., change altitude). Link 210 may comprise a direct, physical connector (e.g., wire, cable) or an indirect communications connection (e.g., wireless transceivers). System 202 may comprise a number of collocated or remote navigation systems or combinations thereof—from a pilot onboard an aircraft to a remote flight control system on a satellite.

If a change in the position of assembly 100, with respect to the host craft or housing 104, is desired, system 206 provides notification of the desired change to system 202 via link 210, which communicates the necessary adjustment to assembly 100 via link 212. Link 212 may comprise a communicative link (e.g., cable, wireless transceivers) that notifies assembly 100 of the desired change (e.g., raise, lower, rotate), leaving assembly 100 to actuate the change via internal or externally associated mechanical systems (e.g., hydraulics). Alternatively, link 212 may comprise a mechanical link that directly effects the desired change itself. Link 210 may comprise a direct, physical connector (e.g., wire, cable) or an indirect communications connection (e.g., wireless transceivers).

If a change in the position of one or more of the individual sensors in assembly 100 is desired, system 206 provides notification of the desired change to camera control system 204 via communicative link 214 (e.g., change position of focal intersection point 132). Link 214 may comprise a direct, physical connector (e.g., wire, cable), or an indirect communications connection (e.g., wireless transceivers). Individual sensors within assembly 100 receive notification of desired changes (e.g., change position, change angle) via links 216, which communicate the necessary adjustments to members 114. Links 216 may comprise communicative links (e.g., cables, wireless transceivers) that notify members 114 of changes desired (e.g., raise, lower, rotate), leaving members 114 to actuate the changes via internal or externally associated mechanical systems (e.g., hydraulics). Alternatively, links 216 may comprise mechanical links that directly effect the desired changes. System 204 may comprise a number of control devices and systems, disposed within assembly 100, located externally but proximal to assembly 100, or remote from assembly 100, or combinations thereof.

Although depicted as separate systems in FIG. 2, systems 202, 204, and 206 may, depending upon the application and host craft or housing 104 configuration, comprise separate functionalities of a single control system deployed within the host craft. Consider for example, a computer-based, self-contained, electro-mechanical control system on board a manned surveillance aircraft. In other embodiments (e.g., a surveillance satellite), certain elements (e.g., system 202 and 204) may be deployed within the host craft (e.g., the satellite), while other elements (e.g., system 206) are remotely located (e.g., at a monitoring facility). Other combinations of the systems described above are also comprehended by the present invention.

Figure 3:
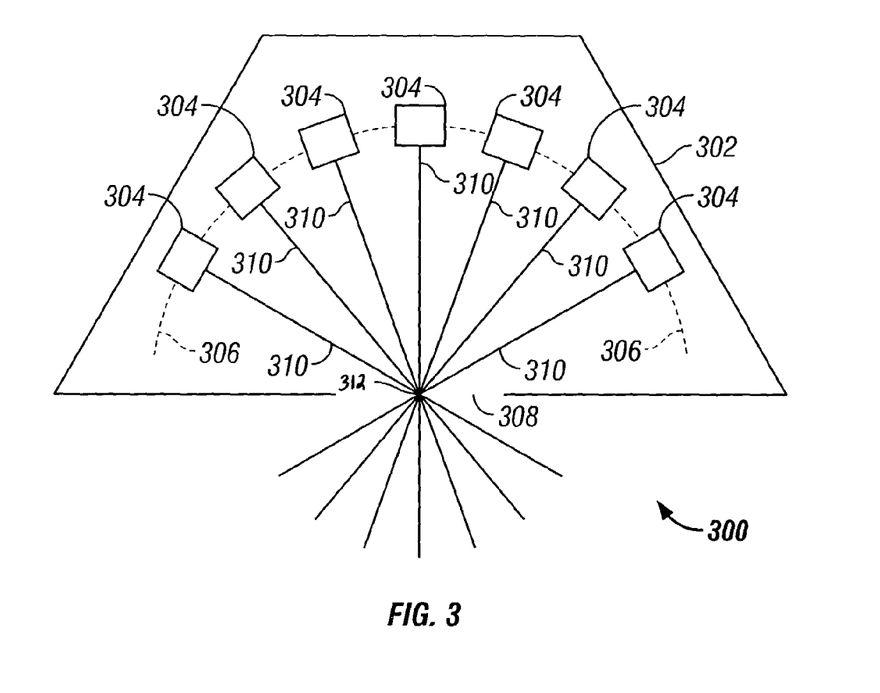
FIG. 3 illustrates a cross-sectional view of one embodiment of an imaging array according to the present invention.

Referring now to FIG. 3, another embodiment of the present invention is provided as an illustrative example. FIG. 3 depicts a camera array assembly 300, comprising a housing 302 within which a plurality of imaging sensors 304 are disposed along a concave curvilinear array axis 306. Assembly 300 is essentially identical in composition, construction, and operation to assembly 100, with the exception of having a greater number of imaging sensors 304 disposed therein. The sensors 304 couple to housing 302, either directly or indirectly, by attachment members (not shown). The sensors 304 may couple collectively to a single transverse cross member 116, individually to lateral cross members 118, or directly to housing 302. Housing 302 comprises an aperture 308 formed in its surface, between the sensors 304 and a target below (not shown). Depending upon the specific type of imaging application and host craft, aperture 308 may comprise a void, a protective screen or window, or a lens or other optical device. Aperture 308 is formed with a size and shape sufficient to provide sensors 304 proper line of sight to a target region.

Sensors 304 are disposed within or along housing 302 such that the focal axes 310 of all sensors 304 converge and intersect each other within the area defined by aperture 308. Again, the focal axes 310 of all sensors 304 may intersect at exactly one intersection point 312, or may intersect at a plurality of intersection points all within close proximity to each other and within the area defined by aperture 308. As depicted in FIG. 3, the sensors 304 are disposed within housing 302 along array axis 306 in a "cross-eyed" fashion. One sensor is centrally disposed, with focal axis 310 directed orthogonally from housing 302. The other sensors 304 are alternately disposed within housing 302 along axis 306 such that the focal axis 310 of each sensor 304 converges upon point 312, crosses the focal axis of the central sensor, and aligns its field of view with a target area opposite its respective position in the array. Again, the sensors 304 may comprise a number of imaging devices including individual cameras, infrared sensors, seismic sensors, photo detectors and photocells—either as individual devices or as a group. Preferably sensors 304 are all of a homogenous nature, but they may comprise a combination of varied imaging devices. Again, the relative positions and angles of the sensors 304 may be fixed, or may be manually or mechanically adjustable.

The embodiments described thus far are particularly useful for collecting and processing imaging data from extremely wide, rectilinear strips. Using orthophotographic techniques, the rectilinear image can be combined with subsequent images taken along the host craft's flight path to create a composite image having an extremely large FOV. The present invention provides further embodiments that may lessen or eliminate the need for orthophotographic techniques, depending upon the application.

Figure 4A:
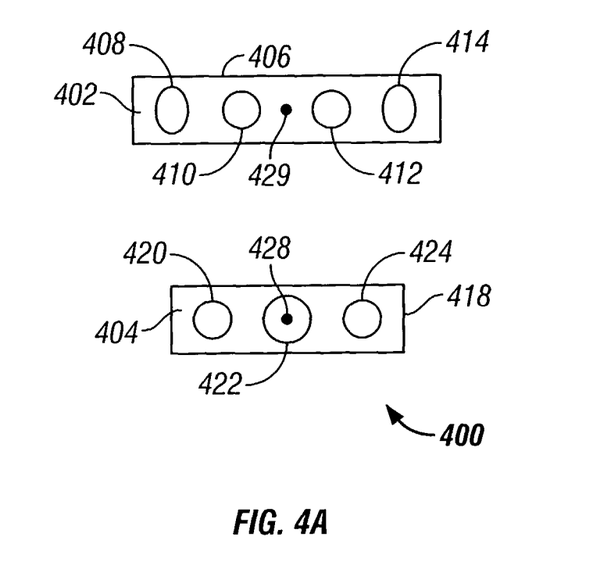
FIG. 4A illustrates a bottom view of one embodiment of an imaging array according to the present invention.
Figure 4B:
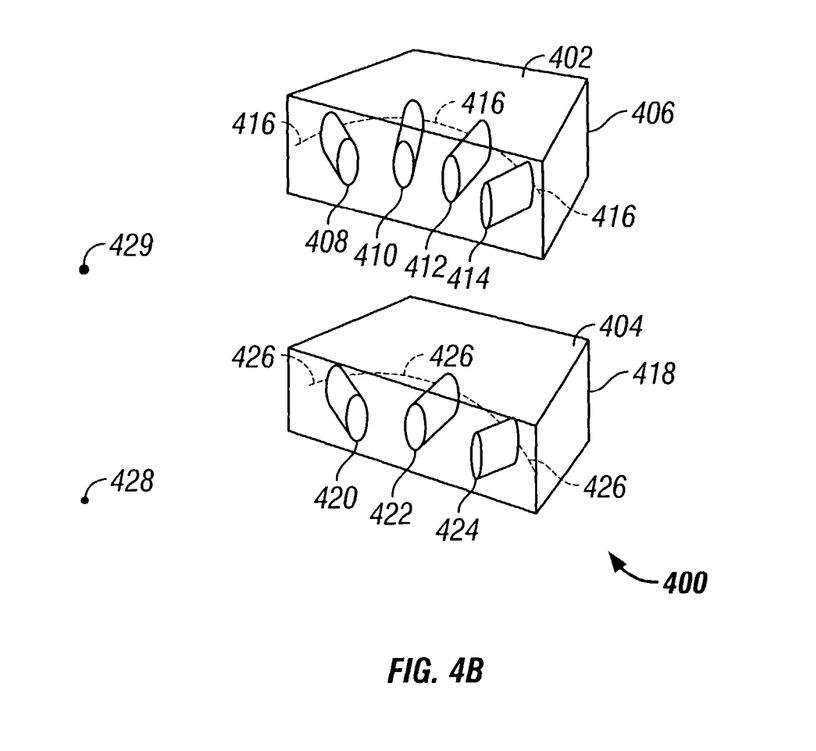
FIG. 4B illustrates a perspective view of the imaging array of FIG. 4A.

One such embodiment is illustrated now with reference to FIGS. 4A and 4B. FIGS. 4A and 4B depict a camera array assembly 400. Except for the differences described hereafter, assembly 400 is similar in composition, construction, and operation to assemblies 100 and 300. As depicted in FIGS. 4A and 4B, assembly 400 comprises first imaging element or array 402 and second array 404. Arrays 402 and 404 are configured as parallel sub-arrays of imaging sensors, longitudinally offset by a desired margin. Array 402 comprises housing 406, within which imaging sensors 408, 410, 412, and 414 are disposed in accordance with the present invention along concave curvilinear array axis 416. Array 404 comprises housing 418, within which imaging sensors 420, 422, and 424 are disposed in accordance with the present invention along concave curvilinear array axis 426. Elements 402 and 404 are disposed within a host craft in close longitudinal proximity to each other, having axes 416 and 426, preferably in parallel alignment, to collect and provide imaging data for a common target region (not shown).

Sensors 408, 410, 412, 414, 420, 422, and 424 are preferably similar in shape and size, but may be of differing shapes and sizes, providing the ability to retrieve an image of the target region having a desired shape or size. Individual sensors having specific shapes and sizes can be disposed and manipulated to focus on image areas that adjoin or overlap in desired patterns. As depicted in FIGS. 4A and 4B, sensor 422 is centrally disposed within housing 418 along array axis 426 such that its focal axis is directed from housing 418 through intersection area 428. Area 428 is a point or small region through which the focal axes of all the imaging sensors within 418 align. Arrays 402 and 404 may be disposed within assembly 400 such that area 428 is orthogonally centered with respect to sensor 422, whereas the array 402 is orthogonal centered on area 429 (as depicted in FIG. 4A).

Sensors 420 and 424, similar in shape and size to sensor 422, are alternately disposed within housing 418 along array axis 426 such that the focal axis of each converges upon area 428, crosses the focal axis of sensor 422, and aligns its field of view with a target area opposite its respective position in the array 404.

Sensors 410 and 412, similar in shape and size to sensor 422, are alternately disposed within housing 406 along array axis 416 such that the focal axis of each converges upon area 429 and align their field of view with a target area opposite their respective position in the array 404. Sensors 410 and 412 are disposed within housing 406 such that their fields of view align with the gaps between sensors 420, 422, and 424.

Sensors 408 and 414, preferably of similar size and shape as sensor 422, are alternately disposed within housing 406 along array axis 416 such that the focal axis of each converges upon area 429. Sensors 410 and 412 are disposed within housing 406, outside sensors 410 and 412, such that their fields of view align outside all sensors in element 404. The slight offset in the sensors of elements 402 and 404 provide assembly 400 with the ability to produce images having customizable FOVs. In alternative embodiments, any number of arrays, containing any number of sensors having various shapes and sizes, may be combined to provide imaging data on any desired target region. In such embodiments, the resulting offset in images collected by the sub-arrays of assembly 400 may be resolved with one another, using a variety of image processing techniques, to provide a single high-resolution image.

Figure 5:
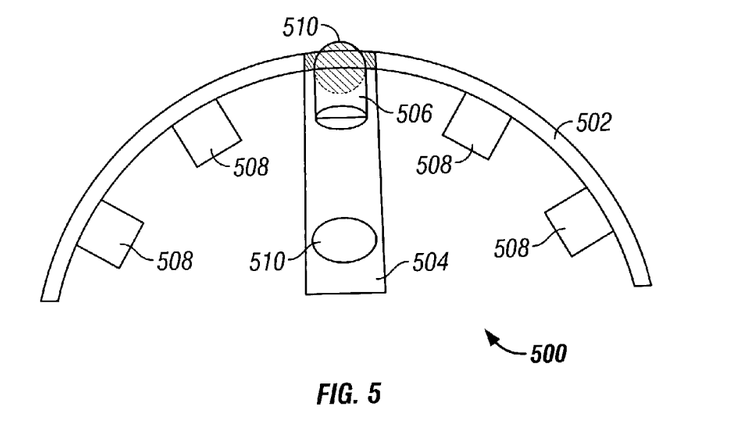
FIG. 5 illustrates a cross-sectional view of one embodiment of an imaging array according to the present invention.

In still another embodiment of the present invention, depicted in FIG. 5, a cross-sectional view of a camera array assembly 500 is illustrated. Except for the differences described hereafter, assembly 500 is similar in composition, construction, and operation to assemblies 100, 300 and 400. Assembly 500 comprises a first compound member 502, shown in side view, and a second compound member 504, shown in cross-sectional view. Member 502 comprises a curvilinear support member or array, to which a number of imaging sensors 508 are disposed along its concave side. A primary imaging sensor 506 is centrally disposed along the concave side of member 502, with its focal axis directed orthogonally downward from assembly 500.

A number of imaging sensors 508 are also disposed along the concave side of member 502, in a "cross-eyed" fashion. The cross-eyed sensors 508 are alternately disposed along member 502 such that the focal axis of each sensor 508 converges upon and crosses the focal axis of sensor 506 at a single intersection area (not shown), and aligns its field of view with a target area opposite its respective position in the array.

Member 504 also comprises a curvilinear support member or array, to which a number of imaging sensors 510 are disposed along its concave side. Member 504 is preferably formed orthogonal to 502 and is of a size and curvature sufficient to match the arch of member 502. Member 504 may be formed or disposed such that its concave surface contacts, or even couples to, the convex surface of member 502 at its apex. Alternatively, member 504 may bridge over member 502, clearing its apex within proximal distance thereto. Imaging sensors 510 are disposed along the concave side of member 504, in a "cross-eyed" fashion. The cross-eyed sensors 510 are alternately disposed along member 502 such that the focal axis of each sensor 510 converges upon and crosses the focal axis of sensor 506 at the single intersection area, and aligns its field of view with a target area opposite its respective position in the array.

The distance and angular offsets in the sensors of elements 502 and 504, coupled with the shared intersection area, provide assembly 500 with the ability to produce images having customizable FOVs. Depending upon the elements and sensors utilized, assembly 500 may be deployed to produce stereoscopic images. In alternative embodiments, any number of elements, containing any number of sensors having various shapes and sizes, may be combined to provide imaging data on any desired target region.

Figure 6:
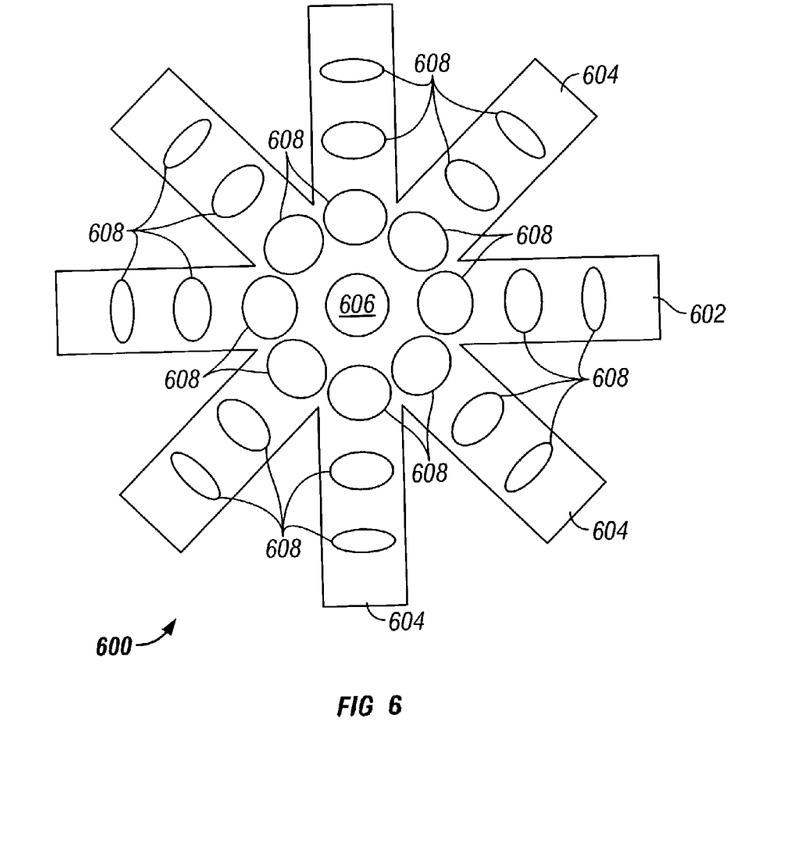
FIG. 6 illustrates a bottom view of one embodiment of an imaging array according to the present invention.

Another embodiment, enhancing the advantages of assembly 500, is illustrated in FIG. 6. FIG. 6 depicts a camera array assembly 600 from a bottom view. Assembly 600 comprises a primary compound curvilinear member or array 602, and a plurality of compound curvilinear members 604 that are formed of size and curvature sufficient to offset and arch over or contact member 602 at various angular intervals. Any number of members 604 may be employed, and may be so numerous as to form a dome structure for mounting sensors. The angular displacement between the members 604 varies depending upon the size of the members and the desired imaging characteristics. For example, assembly 600 may comprise two support members in an orthogonal (i.e. 90°) relationship with one another. Another assembly, having three support members, may be configured such that the angular displacement between members is 60°.

A primary imaging sensor 606 is centrally disposed along the concave side of member 602, with its focal axis directed orthogonally downward from assembly 600. A number of imaging sensors 608 are disposed, in accordance with the teachings of the present invention, along the concave sides of members 602 and 604 in a "cross-eyed" fashion. The cross-eyed sensors 608 are alternately disposed along members 602 and 604 such that the focal axis of each sensor preferably converges upon and crosses the focal axis of sensor 606 at a single intersection area (not shown), and aligns its field of view with a target area opposite its respective position in the array. Depending upon the shape and size of sensors 608, assembly 600 provides the ability to produce images having customizable FOVs, of a generally circular nature. Depending upon the elements and sensors utilized, assembly 600 may be deployed to produce stereoscopic images. In alternative embodiments, any number of elements, containing any number of sensors having various shapes and sizes, may be combined to provide imaging data on any desired target region.

Figure 7:
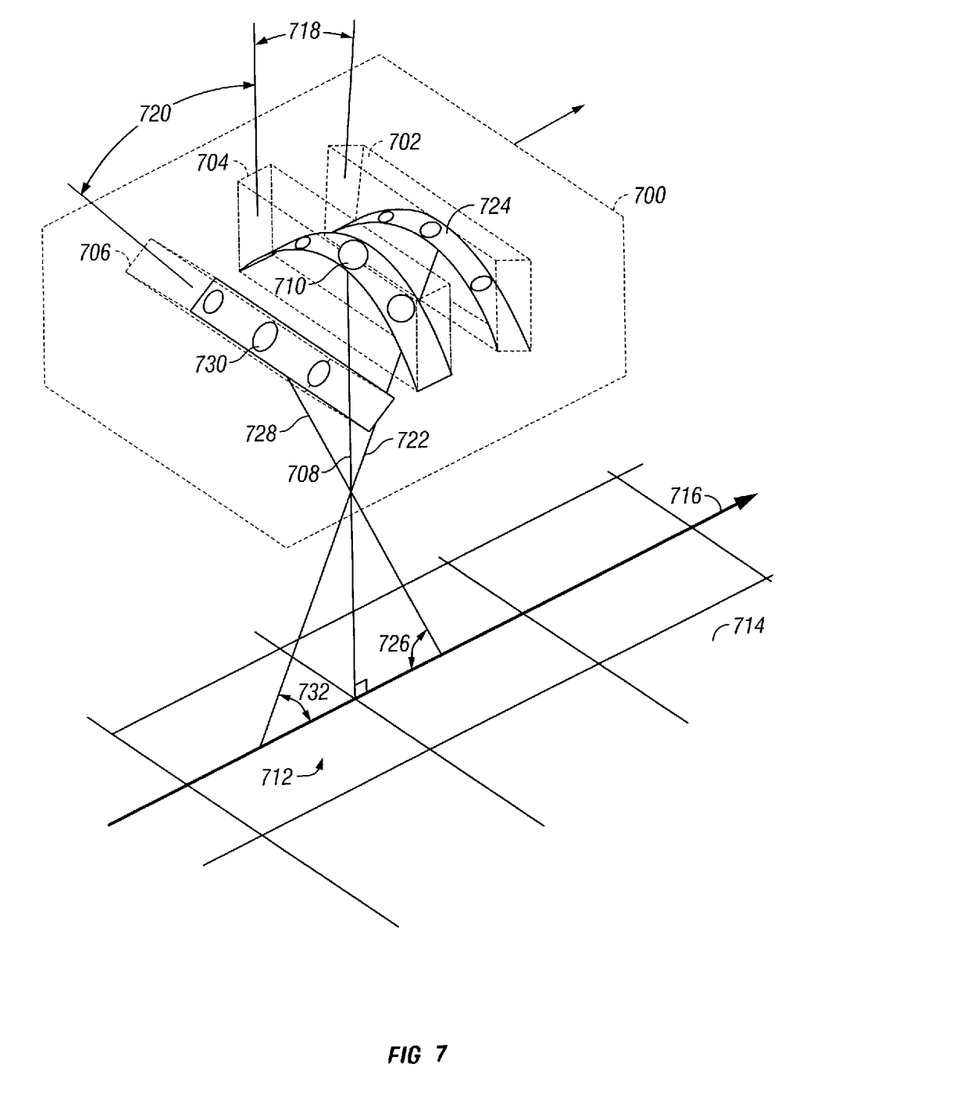
FIG. 7 illustrates one embodiment of a remote imaging system according to the present invention.

Referring now to FIG. 7, one embodiment of a camera array assembly 700 in accordance with the present invention is depicted. Assembly 700 is similar in composition, construction, and operation to assemblies 100, 300 and 400. Assembly 700 comprises first imaging element or array 702, second imaging array 704, and third imaging array 706. Array 704 is configured as a primary sensor array, disposed within assembly 700 such that the focal axis 708 of its primary sensor 710 is directed downwardly from assembly 700, orthogonal to target area 712 along terrain 714. Assembly 700 is disposed within a host craft that moves, with respect to terrain 714, along flight path 716. Elements 702, 704 and 706 are configured within assembly 700 as sub-arrays of imaging sensors. Element 702 is offset, with respect to flight path 716, ahead of element 704 and offset there from by angular offset 718. Similarly, element 706 is offset, with respect to flight path 716, behind element 704 and offset there from by angular offset 720. Angular offset 718 is selected such that the focal axis 722 of primary sensor 724 on element 702 is directed downward to target area 712, forming angle 732. Angular offset 720 is selected such that the focal axis 728 of primary sensor 730 on element 706 is directed downward to target area 712, forming angle 726. Angular offsets 718 and 720 are preferably equal, although they may be skewed to provide a desired imaging effect. The focal axes of the other individual sensors along elements 702, 704 and 706 form similar angular relationship to target area 712 and one another, subject to their respective positions along the elements. Imaging data is characterized, on a pixel-by-pixel basis, in terms of the positional and angular relationships described above.

Knowing the positional and angular relationships among elements 702, 704, 706, and their constituent individual sensors, imaging data collected by assembly 700 are processed to provide high-resolution orthographic images. In alternative embodiments, the elements and sensors are configured, and the data collected is processed, to provide high-resolution stereographic images. The size and resolution of the imaging array may be altered in accordance with the present as described above.

In another embodiment of the present invention, the camera assembly 700 is modified and comprises one imaging element or array 702, configured as a primary sensor array, as described above, and having an actuator or motor (not shown) that rocks or moves the array 402 back and forth. Alternatively, the actuator may flip or rotate the array 702. In one preferred embodiment, the array 702 is directed to forward, downward, and backward positions. In another embodiment of the invention, the array 702 is stationary, and a moving mirror system is used in conjunction with the mirror system to collect sensor data from multiple positions of the terrain 714.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A retinal array compound camera system for producing an image of a target, comprising:
    a housing adaptably mountable to a vehicle, wherein the housing has an aperture formed in the housing surface between at least two imaging sensors and a target image, and wherein the aperture is selected from a group consisting of a void, a screen, a window and an optical device not including a lens;
    a first imaging sensor having a first lens, disposed within the housing, and having a first focal axis;
    at least one second imaging sensor having at least a second lens, disposed within the housing in a concave or retinal configuration and offset from the first imaging sensor in an cross track, cross-eyed fashion, and having at least a second a focal axis, wherein the focal axes pass through the aperture.

2. The system of claim 1, wherein the first imaging sensor is centrally disposed within the housing.

3. The system of claims 1, wherein the focal axes intersect within an intersection area.

4. The system of claims 1, wherein the focal axes intersect at the target.

5. The system of claim 1, wherein the imaging sensors are coupled to the housing in at least two arrays.

6. The system of claim 5, wherein the arrays are parallel to each other.

7. The system of claim 5, wherein there are at least two arrays, a first array that is centrally coupled to the housing, and secondary arrays that are offset from the first array and angled so that the focal points of the first array and the secondary array coincide on the target.

8. The system of claim 5, wherein the arrays extend radially from a central point.

9. The system of claim 1, wherein the imaging sensors are coupled to a dome in the housing.

10. The system of claims 1, wherein an intersection area is located along at least one focal axis and at a location from the aperture of the housing to before the target.

11. A retinal array compound camera system for producing an image of a target viewed through an aperture, comprising:
    a housing adaptably mountable to a vehicle, wherein the housing has an aperture formed in the housing surface between at least two imaging sensors and a target image, and wherein the aperture is selected from the group consisting of a void, a screen, a window and an optical device not including a lens; and
    at least two imaging sensors coupled to the housing in a concave or retinal configuration in an cross track, cross-eyed fashion, each imaging sensor producing a portion of the image, each having a focal axis passing through the aperture, and each imaging sensor having a different lens.

12. The system of claim 11, wherein the focal axes intersect within an intersection area.

13. The system of claim 11, wherein the focal axes intersect at the target.

14. The system of claim 11, wherein an intersection area is located along at least one focal axis and at a location from the aperture of the housing to before the target.

* * * * *